3,314,895
PROCESSES FOR SELECTIVE DEMETHYLATION AND FOR PREPARATION OF CATALYSTS FOR USE THEREIN
George W. Munns, Jr., West Deptford Township, Gloucester County, N.J., assignor to Mobil Oil Corporation, a corporation of New York
No Drawing. Filed June 16, 1964, Ser. No. 375,669
19 Claims. (Cl. 252—455)

The present invention relates to selective demethylation reactions and to processes of producing novel catalysts for use therein and, more particularly, to selective demethylation reactions involving the use of crystalline aluminosilicate catalysts and methods for the preparation of such catalysts.

Demethylation reactions wherein a demethylatable organic compound is reacted with hydrogen to form a product deficient in methyl groups and resulting in the simultaneous production of methane are well known. For example, it is known that nickel and cobalt catalysts are quite capable of inducting the hydrogenolysis of paraffins according to the following general equation:

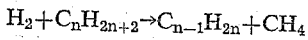
$$H_2 + C_nH_{2n+2} \rightarrow C_{n-1}H_{2n} + CH_4$$

This reaction is potentially quite useful for the preparation of a variety of chemicals, and particularly for improving the octane number and/or the volatility characteristics of fuels such as gasoline.

Over the ordinary nickel or cobalt catalysts, paraffin demethylation is an exothermic reaction with an extremely high temperature coefficient of reaction rate. Once the reaction starts, the heat produced acts to increase catalyst temperature, thus accelerating the reaction rate which, in turn, produces additional heat. The net result is the production of catalyst "hot spots" at which secondary demethylation of primary reaction products occurs to reduce net yield. The problem of temperature control during demethylation is aggravated if aromatics are present in the charge stream due to the hydrogenation of such components over the usual nickel or cobalt catalysts. When using this process to improve the octane number of gasolines, the unavoidable hydrogenation of benzene over the usual catalysts not only aggravates the problem of temperature control but also involves conversion of the high octane benzene component to lower octane products, thereby detracting from improvement in octane rating resulting from dimethylation of the paraffins.

Attempts to solve this problem have either been unsuccessful or have created collateral difficulties. For example, attempts to remove the benzene from the $C_6$ fraction prior to demethylation have presented extremely difficult separation problems. Another suggestion has been to dilute the charge stock with steam or methane or to use a previously partly deactivated catalyst at high temperatures. These suggested methods of operation have not proved to be entirely satisfactory, since dilution of the charge stock with steam or methane has involved the introduction of a separate diluent component into the reaction mixture while prior partial deactivation of the catalyst has necessitated careful control over catalyst activity.

In accordance with the present invention, it has now been discovered that demethylation reactions such as described above may now be carried out without the attendant problems created by prior art techniques primarily through the use of a unique class of catalytic materials: solid, porous, crystalline aluminosilicates.

It is accordingly a principal object of the present invention to provide a novel process for conducting a demethylation reaction involving the use of crystalline aluminosilicate catalysts.

It is another important object of the present invention to provide a novel process for removing at least one methyl group from a demethylatable organic compound comprising carrying out the demethylation reaction in the presence of a crystalline aluminosilicate.

It is a further object of the present invention to provide a process for removing at least one methyl group from a paraffinic organic compound in admixture with a hydrogenatable organic compound comprising reacting the former with hydrogen in the presence of a crystalline aluminosilicate catalyst whose active catalytic sites are substantially completely restricted to its interstitial pores.

It is another object of the present invention to provide a process for removing at least one methyl group from a demethylatable organic compound in admixture with a hydrogenatable organic compound comprising reacting the former with hydrogen in the presence of a crystalline aluminosilicate catalyst whose active catalytic sites are substantially completely restricted to its interstitial pores.

It is still a further object of the present invention to provide a novel process for demethylating a straight chain paraffin in admixture with isoparaffins, naphthenes and/or unsaturated compounds such as benzene by reacting said straight chain paraffin with hydrogen in the presence of a crystalline aluminosilicate catalyst, said catalyst having uniform interstitial spaces which contain cobalt and/or nickel.

It is another important object of the present invention to provide a novel process for the selective demethylation of straight chain paraffins through the use of a shape selective crystalline aluminosilicate catalyst containing nickel or cobalt and which will accept only straight chain paraffins in the interstitial spaces of its crystal lattice.

It is still another object of the present invention to provide a novel process for increasing the octane number of gasoline which comprises selectively demethylating the low octane straight chain paraffin constituents of a hydrocarbon mixture in the gasoline boiling range to higher octane products without substantial conversion of non-straight chain paraffin constituents of the mixture.

It is another object of the present invention to provide a novel process for converting gasoline which contains normal paraffins to gasoline of higher octane number and a more volatile paraffinic fuel composed essentially of hydrocarbons containing two to four carbon atoms.

It is a further important object of the present invention to provide novel methods for synthesizing crystalline aluminosilicates having metal-containing material restricted substantially completely to their interstices which methods involve treatment of an aluminosilicate the outer and interstitial surfaces of which bear a metal-containing material with a reagent capable of converting said material to a new form sufficiently large to prevent it from passing between said outer and interstitial surfaces and removing the new form of said material which is on said outer surface without at the same time removing said new form of said material in said interstices.

It is still a further important object of the present invention to provide a novel method for synthesizing crystalline aluminosilicates having particular utility in selective demethylation reactions wherein a metal which is catalytically active in said demethylation reaction is introduced into the interior of said aluminosilicate.

It is another important object of the present invention to provide a novel process for the synthesis of crystalline aluminosilicates having particular utility in selective demethylation reactions in which a metal which is a catalyst for said demethylation reaction is loaded substantially exclusively in the interstitial spaces of said aluminosilicate by means of in situ carbonyl formation in said crystalline aluminosilicate.

It is still another important object of the present invention to provide a novel process for synthesizing crystalline aluminosilicates having particular utility in selective demethylation reactions in which a metal catalyst for said reaction and which is present on the outer and interstitial surfaces of the aluminosilicate is restricted to the latter through treatment of the aluminosilicate with a reagent which catalytically deactivates the metal present on said outer surfaces.

These and other objects and advantages of the present invention will become more apparent through reference to the ensuing description and appended claims.

Generally speaking, the various objects and advantages of the present invention are broadly attained by contacting the charge material containing the compound to be demethylated in admixture with those compounds not desired to be demethylated with hydrogen in the presence of shape-selective nickel or cobalt-containing crystalline aluminosilicate catalyst in which the catalytic activity is substantially completely restricted to the interstitial spaces within the crystal lattice of the aluminosilicate and wherein the aluminosilicate is so chosen that only the material desired to be demethylated may enter such interstitial spaces. By use of such shape-selective catalysts, the desired demethylation reactions may be carried out without undesirable conversions such as the hydrogenation of benzene. The most significant application of this broad object, as will be described hereinafter, is the selective demethylation of paraffinic materials in admixture with non-paraffinic materials, and preferably straight chain paraffins in admixture with branched chain paraffins, aromatics and naphthenes, the crystal being so chosen that only the paraffinic materials (or the straight chain paraffins as the case may be) may enter the interstitial spaces of the aluminosilicate.

In order to appreciate fully the various ramifications of the present inventive concepts, a brief understanding of the nature of the catalytic materials usable in the process of the present invention is necessary. The catalysts which are used in the present invention are crystalline aluminosilicates which may be described as a rigid three dimensional network of $SiO_4$ and $AlO_4$ tetrahedra in which the tetrahedra are cross-linked by the sharing of oxygen atoms whereby the ratio of the total aluminum and silicon atoms to oxygen atoms is 1:2. The electrovalence of the tetrahedra containing aluminum is balanced by the inclusion in the crystal of a cation, for example, an alkali metal or an alkaline earth metal cation. This equilibrium can be expressed by formula wherein the ratio of $Al_2$ to the number of the various cations, such as Ca, Sr, $Na_2$, $K_2$ or $Li_2$, is equal to unity. In their hydrated form, the aluminosilicates may be represented by the formula:

$$xMAl_{2/n}O:Al_2O_3:ySiO_2:zH_2O$$

wherein M is a cation which balances the electrovalence of the tetrahedra, $x$ the moles of $M_{2/n}O$, $n$ represents the valence of the cation, $y$ the moles of $SiO_2$ and $z$ the moles of $H_2O$, the removal of which produces the characteristic open network system of such zeolitic materials.

These zeolitic materials are ordered crystalline aluminosilicates which have a definite crystalline structure within which there are interstitial passages, pores or cavities of definite ranges of size. Since the dimensions of these interstitial pores, which are substantially uniform in size, are such as to accept for adsorption molecules of certain dimensions while rejecting those of larger dimensions, these materials have come to be known as "molecular sieves."

Molecular sieves are ordinarily prepared initially in the sodium form of the crystal, the sodium ions in the resulting product being exchangeable for other cations as previously mentioned. In general, the process of preparation of such materials involves heating, in aqueous solution and under atmospheric pressure or less, an appropriate mixture of oxides or of materials whose chemical composition can be completely represented as a mixture of oxides $Na_2O$, $Al_2O_3$, $SiO_2$ and $H_2O$ at a temperature of approximately 21° C.–150° C. and preferably 100° C. for periods of 15 minutes to 90 hours or more. The material which is first formed on mixing the reactants is an amorphous gel which, after the reaction has proceeded sufficiently forms a crystalline product which may be separated therefrom and water washed until the water in equilibrium with the zeolite has a pH in the range of 9–12. The crystals are then dried at a temperature between 25° C. and 150° C. After activating by heating until dehydration is attained, i.e., at 350° C. and 1 mm. pressure, the substance is ready for use.

One of the characteristics of these aluminosilicates is that the cations described above may be exchanged either partially or in their entirety by one or more additional cations using ion exchange techniques. By means of such cation exchange, it is possible to vary the size of the interstitial pores or spaces in the given aluminosilicate by suitable selection of the particular cation. For example, as is described more particularly in Johnson et al., Patent 2,971,824, a synthetic zeolite known as "molecular sieve 4A" is a crystalline sodium aluminosilicate having interstitial pores or spaces approximately 4 A. in diameter, this material in its hydrated form being characterized by the unit cell formula:

$$Na_{12}(AlO_2)_{12}(SiO_2)_{12} \cdot 27H_2O$$

On the other hand, the synthetic zeolite known as "molecular sieve 5A" is a crystalline aluminosilicate having interstitial spaces of about 5 A. in diameter and in which 4 or more of the 12 ions of sodium in the unit cell formula of molecular sieve 4A have been replaced by calcium (it being understood that calcium replaces sodium in the ratio of one calcium ion for two sodium ions).

As will be appreciated from the above, by proper preparation and selection of the molecular sieve catalyst, the catalyst can readily be made selective as to its adsorption properties in that the interstitial pore size can be so adjusted that of a mixture of materials of different sizes, only certain of the materials will be small enough to enter the interstitial pores of the molecular sieve.

This feature is taken advantage of in the present invention in a variety of ways. For example, in the demethylation of a gasoline petroleum fraction which contains straight chain paraffins in admixture with isoparaffins, benzene and naphthenes, the use of molecular sieve 5A will permit only the straight chain paraffin constituent to enter into the interstitial pores of the sieve, the isoparaffins, benzene and naphthenes being too large to enter therein. By so preparing the molecular sieve that the demethylation promoter, i.e., the cobalt or nickel, is located substantially completely in said interstitial pores, the reaction can be substantially completely restricted to said interstitial pore area. Since the non-straight chain paraffin constituents of the mixture are too large to enter the interstitial pores and to come in contact with the cobalt or nickel, these constituents will remain substantially unaffected during the demethylation reaction and, accordingly, the various prior art demethylation collateral problems (such as hydrogenation of unsaturates and/or the reduction in octane number of gasoline through the hydrocracking of the isoparaffins and the like) are avoided without any attendant disadvantages in the primary demethylation process.

In this connection, it must be noted by way of example that since benzene hydrogenation is extremely sensitive even to small amounts of hydrogenation catalyst on the outer surfaces of the molecular sieve and since the nickel and cobalt tend to catalyze the hydrogenation reaction with benzene, the restriction of the nickel and/or cobalt to the interstitial pore area of the molecular sieve is extremely important and, while not the sole inventive feature of the instant application, is an extremely important one.

Details of the preparation of the molecular sieves which are usable as the catalysts in the present invention are provided merely by way of example in the Johnson et al. Patent 2,971,824 previously referred to and in Patent No. 3,033,778. Since it would serve no useful purpose to repeat the descriptions in those patents as to the method of making such molecular sieves, such teachings are hereby incorporated by reference in this application.

While not so restricted, the molecular sieves which provide the greatest advantages for carrying out the process of the present invention are those of the "A" and "T" variety. Zeolite A can be represented in mole ratios of oxides as:

$$1.0 \pm 0.2 M_{2/n}O : Al_2O_3 : 1.85 \pm 0.5 SiO_2 : yH_2O$$

wherein M represents a metal cation, $n$ is the valence of M, and $y$ is any value up to about 6. As usually prepared, Zeolite A contains primarily sodium cations and is designated sodium Zeolite A.

The formula for Zeolite T in terms of oxide mole ratios may be written as:

$$1.1 \pm 0.4 xNa_2O : (1-x)K_2O : Al_2O_3 : 6.9 \pm 0.5 SiO_2 : yH_2O$$

wherein $x$ is any value from about 0.1 to about 0.8 and $y$ is any value from about 0 to about 8.

Regardless of which molecular sieve is utilized in the practice of the present invention, however, the maximum advantage of the teachings of the present invention are attained with molecular sieves whose interstitial pore diameter is so chosen that the sieve is shape-selective as to the material which is to be demethylated as between such material and the other materials with which it is in admixture. For example, in the selective demethylation of straight chain paraffins in admixture with isoparaffins, aromatics and/or naphthenes, the most advantageous molecular sieve is the molecular sieve 5A.

As is well known in the art, cobalt and nickel-containing sieves may be prepared in a variety of ways, the simplest method being generally to exchange the nickel or cobalt for some or all of the cations in the previously prepared molecular sieve. Following such exchange, the cobalt or nickel-bearing material is heated to remove water and, subsequently, the zeolitic molecular sieve is contacted with a reducing agent such as gaseous hydrogen or sodium vapor.

While this and the other nickel or cobalt-loading techniques are simple and extremely useful for a variety of purposes, such techniques provide relatively poor catalyst selectively as to the material desired to be demethylated (viz, the straight chain paraffins) primarily because they do not eliminate to the necessary extent the presence of cobalt and nickel on the outer surface of the zeolite (that portion of the sieve other than the interstitial pores) and, accordingly, secondary reactions still take place. [This fact will be discussed in greater detail in an ensuing portion of this specification.] In view of this fact, such molecular sieves must be so treated as to restrict the catalytically active sites (i.e., those containing the cobalt and nickel promoters) substantially completely to the interstitial spaces of the sieves.

The desired catalyst selectivity and the restriction of the promoter elements to the interstitial pores of the molecular sieves may be carried out by several effective methods. One of these methods involves the removal of external nickel (or cobalt) from the crystalline aluminosilicate by means of ammine complex formation. For example, treatment of a previously prepared nickel- or cobalt-containing 5A crystalline aluminosilicate with concentrated ammonium hydroxide forms a water soluble complex. This complex ammine is too large to enter or leave the aluminosilicate cavity so that only that present on the outer surfaces of the material is removed. Simple heating results in decomposition of the complex leaving the nickel or the cobalt in the inner regions of the aluminosilicate. This technique is illustrated in greater detail in Example 1:

EXAMPLE 1

To 20 grams of 4A aluminosilicate was added 250 ml. of distilled water containing 30.9 grams cobalt chloride hexahydrate. The mixture was stirred for 1 hour. The solids were removed by filtration and the solids after washing reslurried in 150 ml. of distilled water containing 33.3 grams calcium chloride. The solids were again filtered and slurried with 250 ml. of conc. $NH_4OH$, filtered and washed with 300 ml. of distilled water. The air dry solids were placed in a muffle for 3 hours at 350° C. The product recovered was black in color and weighed 78.95 grams.

Analysis of this product yielded the following results:

Cobalt, wt. percent=7.1
Calcium, wt. percent=6.5
Sodium, wt. percent=2.3
Water sorption, wt. percent=27.7
n-Hexane sorption, wt. percent=10.0

The catalyst prepared as above formed only 12.5% cyclohexane from benzene, which was much lower than would be formed with a cobalt containing aluminosilicate prepared in a conventional manner. Normal hexane was demethylated by this catalyst, also.

A second method of forming catalysts having the desired selectivity is similar to the method described above in that it involves removal of external nickel (or cobalt) through ammine complex formation but differs therefrom in that the second method involves the simultaneous conversion of the aluminosilicate from one form to another, i.e., conversion from the sodium to the calcium form. For example, a sodium (4A) aluminosilicate may be employed and calcium acetate added to the ammonium hydroxide complexing solution to effect conversion to the 5A aluminosilicate at the same time complex formation is taking place. This technique is illustrated in greater detail in Example 2:

EXAMPLE 2

To 20 grams of 4A aluminosilicate was added 250 ml. of distilled water containing a couple of drops of conc. $NH_4OH$ in which was dissolved 32.4 grams of cobaltous acetate tetrahydrate. The mixture was stirred magnetically for one hour and filtered through a sintered glass funnel. The solids were slurried into a solution containing 22.9 grams of calcium acetate tetrahydrate and 10 ml. of conc. $NH_4OH$ in 250 ml. distilled water. This mixture was stirred for 3 hours and filtered. The solids were washed with several portions of conc. $NH_4OH$ and then with water (distilled), washed again with 15 grams of $Ca(OAc)_2 \cdot 4H_2O$ in 150 ml. conc. $NH_4OH$, then with several portions of conc. $NH_4OH$ once more. The last wash was 100 ml. of distilled water containing 10 ml. of conc. $NH_4OH$. The sample was allowed to pull dry and was removed and placed in an evaporating dish and muffled to 110° C. overnight.

The analyses reported were as follows:

Cobalt, wt. percent=7.6
Calcium, wt. percent=6.9
Sodium, wt. percent=2.8
n-Hexane adsorption, wt. percent=11.9
Water sorption, wt. percent=28.9

Still another technique for preparing catalysts having the desired selectivity involves the synthesis of aluminosilicates containing metal carbonyls. Merely by way of example, nickel carbonyl is too large to escape from the cavity of an A-type of crystalline aluminosilicate. Advantage may be taken of this fact by first exchanging nickel into the aluminosilicate by any conventional method, then reducing the nickel to its metallic form. A stream of CO is then introduced into intimate contact with the aluminosilicate (this may conveniently be done at room temperature) to form nickel carbonyl in the interstices of the aluminosilicate, any external carbonyl being swept away in this stream. The metal may be reovered from the carbonyl by simply heating the material. The nickel, now only within the aluminosilicate cavities, may be converted into other forms by conventional treatment if desired.

While this technique may be utilized to form both cobalt- and nickel-containing aluminosilicates, this approach is more effective to form the latter than the former variety. This technique is illustrated in greater detail in Example 3:

EXAMPLE 3

A 5A molecular sieve exchanged with nickel and treated with a reducing agent such as hydrogen to convert the nickel to the elemental state may be treated with carbon monoxide at room temperature to form nickel tetracarbonyl. Any of the volatile carbonyl on the external surfaces of the sieve will be swept out of the system, the internal carbonyl being retained since it is not able to pass out of the zeolite cavities. The catalyst material is then heated to approximately 200° F. sufficiently to decompose the tetracarbonyl.

As will be readily apparent, while the foregoing methods of preparation of the shape-selective crystalline aluminosilicates are particularly adapted for the preparation of aluminosilicates containing cobalt or nickel in their interstitial spaces, the broad concept involved [viz., the treatment of an aluminosilicate the outer and interstitial surfaces of which contain a metal-containing material with a reagent capable of converting said material to a new form sufficiently large to prevent it from passing between said outer surface and said interstitial spaces and removing the new form of said material which is on said outer surfaces without at the same time removing said new form of said material in said interstitial spaces] is applicable to the loading of a crystalline aluminosilicate with any metal, providing that the new form of the metal-containing material resulting from reagent treatment is sufficiently large to prevent it from passing between the interstitial spaces and outer surfaces of the aluminosilicate. Quite obviously, however, the particular approaches described above are peculiarly advantageous due to the ease with which they may be carried out. Thus, the ammine complex treatment described results in the formation of water soluble ammine complexes which may be readily washed off the outer aluminosilicate surfaces, the remaining complex in the aluminosilicate interstices being readily transformed into the elemental metal form by heating. Similarly, the carbonyl treatment, in which the metal carbonyl formed on the outer aluminosilicate surfaces is swept away in the treating CO stream, is quite effective in accomplishing the desired result. As was the case in connection with the ammine complex treatment, the carbonyl remaining in the aluminosilicate interstices may be readily transformed into the elemental metal form by heating.

Particularly good selectivity in the molecular sieve catalyst may also be obtained by still another approach, in which the outer surfaces of a nickel or cobalt-containing aluminosilicate are selectively poisoned or deactivated. Generally speaking, any regularly used poison for nickel-cobalt hydrogenation activity may be used providing the poison reagent is too large to enter into the interstitial spaces of the molecular sieve. Two such examples are tricresylphosphate and thiophene. Since such poisoning appears to be reversible, the most advantageous way to utilize this method is to incorporate a sufficient quantity of the reagent in the charge stock containing the material to be demethylated so that the desorbed poison can be replaced.

Another approach which appears to be especially practical is the treatment of the catalyst with a hydrocarbon under coking conditions. For example, methylcyclopentane passed over the catalyst in the absence of hydrogen and at a higher temperature as set forth in Table I effectively poisons the activity of the external catalyst sites. The nickel-containing 5A crystalline aluminosilicate referred to in Table I is an "A"-type aluminosilicate containing elemental nickel as described in Example 3. The methylcyclopentane or other poisoning material used in this manner may be present in the charge stock containing the material to be demethylated, in which case the external sites of the catalyst will be poisoned continuously, since such poisoning reagents cannot migrate into the interstitial spaces in the zeolites.

TABLE I.—BENZENE HYDROGENATION OVER METHYLCYCLOPENTANE POISONED CATALYST
[Catalyst: 5A-Crystalline Aluminosilicate Containing Nickel]

| Run No. | Methylcyclopentane Treatment | Approximate wt. percent [3] Cyclohexane Formed |
| --- | --- | --- |
| 1 | None | 22.7 |
| 2 | 1st treatment at 750° F.[1] | 11.1 |
| 3 | 2nd treatment at 750° F.[2] | 2.0 |

[1] This was a first treatment with methylcyclopentane in the absence of hydrogen, the time of treatment being 5 minutes (at 20 cc./min. He flow.
[2] This was a second treatment with methylcyclopentane in the absence of hydrogen, the time of treatment being 5 minutes (at 20 cc./min. He flow.
[3] Reaction Temp.—400° F.

He flow—25 ml./min.
Benzene adsorbed at room temp.
Chromatographic conditions:
  Column: 15 ft. Perkin-Elmer "R" column
  Temp.: 100° C. He flow—60 ml./min.

As has previously been indicated, the demethylation reaction of the present invention is carried out by reacting the demethylatable component with hydrogen in the presence of the novel catalytic materials described above. This demethylation reaction may be carried out either on a batch basis or in a continuous manner.

Batch treatment of the charge material containing the demethylatable component may be effected in reactors or autoclaves of suitable design in which the charge and catalyst are treated with hydrogen under the desired conditions of operation and for a time sufficient to effect the desired demethylation.

The selective demethylation process of the present invention may also be operated continuously in a single chamber or reactor containing a fixed bed or layer of the demethylation catalyst described above through which the charge stock and hydrogen gas are passed under selected conditions of temperature and pressure. Under such conditions of operation, the reaction products are discharged continuously from the reactor at substantially the same rate as that which they are charged into the reactor. The demethylation products may then be separated by suitable means (i.e., by fractionation) to separate the desired demethylated materials from the unconverted portion of the charge stock and the latter may, if desired, be recycled for retreatment.

If desired, of course, a continuous process using a fluidized bed may also be employed in a conventional manner.

The selective demethylation process of the present invention is carried out under correlated conditions of temperature and pressure. Demethylation operating temperatures employed in the process may be from approximately 350°–1100° F., with a preferred temperature range being 450°–750° F. Pressures employed vary between 0 and 2000 p.s.i.g., but best results are obtained between 500 and 600 p.s.i.g. The mole ratio of hydrogen to demethylatable component in the charge stock ranges from about 1:1 up to about 40:1, but best results are obtained with mole ratios between 6:1 and 15:1 to reduce aging and coke formation.

The liquid hourly space velocity ranges from approximately 0.5 to 10 vol./vol./hr. Best results are also obtained by preheating the catalyst before the demethylation process takes place to approximately 700°–1200° F. and, preferably, between 800°–1100° F.

The nature of the organic charge stock will necessarily vary depending upon the ultimately desired use of the process of the present invention. As will be apparent from the previous description, the process is particularly useful for demethylating straight chain paraffin components of natural gasoline but it is also useful for the demethylation of components of other petroleum or reformate fractions. A particularly advantageous starting material is a petroleum "hexane cut" boiling between approximately 120°–160° F. and, while primarily containing straight chain paraffinic materials, containing considerable (10%) benzene and some methylcyclopentane. Quite obviously, the broad inventive concept of the present application will be applicable to the selective demethylation of a demethylatable organic component capable of entering the interstitial spaces or pores in the molecular sieve and particularly with respect to the demethylation of such materials in admixture with other materials which, because of their shape or size, are unable to enter the pores of the molecular sieve.

The following examples will serve further to illustrate the novel process of the present invention:

EXAMPLE 4

Hydrogen was passed through benzene contained in the saturator at room temperature (about 25° C.) with a flow rate of 25 ml./min. The stream, now containing benzene vapor, was then passed through the reactor tube containing a 5A molecular sieve catalyst containing nickel in its interstitial spaces in accordance with the present invention and heated electrically to 400° F. After allowing a period of time for stabilization, a sample was transferred to a gas chromatograph via a linear gas sampling valve. The column utilized for this analysis was 12 ft. long and contained P & E "R" packing. The column temperature used was 100° C. and the flow of helium was 60 ml./min. Analysis indicated formation of only 2.4% benzene compared to 43% for a non-selective sample of similar composition in which the nickel was not restricted to the interstitial spaces of the catalyst.

EXAMPLE 5

Using a similar experimental set-up with n-hexane in the saturator at 0° C., demethylation of the hexane was obtained at several reaction temperatures. The 18 foot column used in the chromatograph at room temperature contained dimethylsulfolane on chromasorb. The n-pentane yield was 2.3% at 610° F. and 1.0% at 559° F.

EXAMPLE 6

*Preparation of a nickel-5A crystalline aluminosilicate without special treatment*

To 20 grams of previously prepared 4A crystalline aluminosilicate was added 100 ml. distilled water, then 150 ml. of a solution prepared by adding 65 grams of nickel chloride hexahydrate to 500 ml. distilled water. The mixture was stirred for 15 minutes and the solids removed by filtration through a porous glass filter. This treatment was again repeated using 100 ml. of the same solution. After stirring for 15 minutes the solids were again removed by filtration, and the filter cake washed with 100 ml. of distilled water. The solids were then placed in 250 ml. of a 1.0 M calcium chloride solution for 20 minutes. The solids were filtered, washed with 250 ml. 1.0 M calcium chloride solution, followed by 500 ml. distilled water. After air drying the sample was removed and placed in a muffle at 350° C. for 3 hours. The recovered material weighed 20.08 grams. The following analyses were reported for this material:

Sodium, wt. percent=1.3
Calcium, wt. percent=9.2
Nickel, wt. percent=5.3
Water adsorption, wt. percent=24.5
n-Hexane adsorption, wt. percent=8.3

Under experimental conditions identical with those shown in Examples 4 and 5, benzene was hydrogenated quite well with 43.8% cyclohexane being formed. n-Hexane was also readily demethylated with this catalyst. By comparison, a known, very active demethylation catalyst, nickel on Keiselguhr, also hydrogenates benzene to this extent under similar conditions, further indicating the non-selective nature of this catalyst.

EXAMPLE 7

A charge stock containing approximately 10% benzene and 90% n-hexane (by weight) was charged over a molecular sieve 5A catalyst exchanged with 5% by weight of nickel, the nickel being restricted to the interstitial pores of the catalyst as previously described. The bench scale high pressure unit was operated at a liquid hourly space velocity at 2.0, a molar hydrogen to hydrocarbon ratio of 10 and at 500 p.s.i.g. The catalyst was pretreated with hydrogen at atmospheric pressure and 950° F. for 10–14 hours. The average bed temperature during the demethylation was maintained at about 700° F. The liquid product recovered contained essentially all of the benzene charged, along with the products formed by demethylation, primarily n-pentane and n-butane. Some of the charge n-hexane remained unconverted.

EXAMPLE 8

A typical charge material, the 120°–160° F. fraction removed from a 98 O.N. reformate, was charged under conditions substantially the same as those described in Example 7. Analysis of this charge material revealed that it had the following composition (the analysis having been made by mass spectrometry):

| Component: | Wt. percent |
|---|---|
| Propane | 0.1 |
| i-Butane | 0.1 |
| n-Butane | — |
| 1-Pentane | 1.3 |
| m-Pentane | 3.1 |
| n-Hexane | 25.6 |
| 2-methylpentane | 23.7 |
| 3-methylpentane | 17.4 |
| 2,2-dimethylbutane | 2.9 |
| 2,3-dimethylbutane | 4.0 |
| 2,2-dimethylpentane | 2.6 |
| Cyclopentane | 1.0 |
| Methylcyclopentane | 7.5 |
| Cyclohexane | 0.2 |
| Benzene | 10.5 |

The recovered liquid contained essentially all of the charged benzene and methylcyclopentane and increased amounts of pentanes and butanes with corresponding decreased $C_6$ paraffinic components.

The process of the present invention provides numerous advantages. For example, it provides a particularly effective means to increase the octane number of gasoline through the demethylation of the low octane straight chain paraffin constituents of a hydrocarbon mixture in the gasoline boiling range without substantial conversion of non-straight chain paraffin constituents of the mixture, many of which are high octane components in their original form. This advantage is attained without the necessity for complete separation of the constituents of the charge stock before demethylation takes place, permitting a much less expensive final separation of the material after demethylation. Still another advantage of the present invention is that normally catalytically poisonous materials which would otherwise have to be removed from the reaction system need not be removed in the practice of the present process since they are excluded from the inner adsorption regions of the crystalline aluminosilicates, permitting a much broader utilization of charge materials than was possible using conventional demethylation techniques.

Still another advantage of this development is that it makes possible the cracking of normal paraffins of a charge stock primarily into the L.P.G. range ($C_2$–$C_4$ paraffins) leaving untouched the valuable high octane components of the fuel. Thus, the process can be carried out to effect the following conversions:

$$nC_6H_{14}+H_2 \rightarrow nC_5H_{12}+CH_4$$
$$nC_5H_{12}+H_2 \rightarrow nC_4H_{10}+CH_4$$
$$nC_4H_{10}+H_2 \rightarrow nC_3H_8+CH_4$$
$$nC_3H_8+H_2 \rightarrow nC_2H_6+CH_4$$

Still other advantages of the present process will either be apparent from the preceding description or have otherwise been previously mentioned in this specification.

While the previous process has been described in connection with the selective demethylation of straight chain paraffins in admixture with non-straight chain components such as isoparaffins, naphthenes and aromatics, it will be readily apparent that the process could also be applicable to permit the demethylation both of the straight chain paraffins and the isoparaffins or of the latter alone, either or both being in admixture with naphthenes, aromatics, etc., by using molecular sieves with slightly larger pore openings than would normally be selective only for the straight chain paraffins. For example, demethylation of isoparaffins can be employed to effect substantial octane improvements. Thus, 2- or 3-methyl pentane can be demethylated to yield isopentane, as follows:

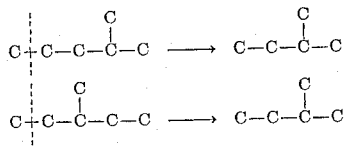

In the foregoing portion of the specification, a novel demethylation process involving the use of crystalline aluminosilicate catalysts has been set forth. It is to be understood, however, that the practice of the present invention is also applicable to isomorphs of said crystalline aluminosilicates. For example, the aluminum may be replaced by elements such as gallium and silicon by elements such as germanium.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A process for preparing a crystalline aluminosilicate having substantially uniform interstitial spaces and containing a material selected from the group consisting of cobalt and nickel-containing materials and wherein substantially all of said material is restricted to said interstitial spaces, said process comprising: providing a crystalline aluminosilicate having substantially uniform interstitial spaces, said aluminosilicate having in its interstitial spaces and on its outer surfaces a material selected from the group consisting of cobalt and nickel-containing materials, treating said aluminosilicate with a reagent capable of converting said material to a new form sufficiently large to prevent it from passing between said interstitial spaces and said outer surfaces and removing said new form of said material which is on said outer surfaces without at the same time removing said new form of said material in said interstitial spaces.

2. A process as defined in claim 1 comprising the additional step of converting the new form of said material in said interstitial spaces to an elemental metal selected from the group consisting of nickel and cobalt.

3. A process for preparing a crystalline aluminosilicate having substantially uniform interstitial spaces and containing a material selected from the group consisting of cobalt and nickel-containing materials and wherein substantially all of said materil is restricted to said interstitial spaces, said process comprising: providing a crystalline aluminosilicate having substantially uniform interstitial spaces, said aluminosilicate having in its interstitial spaces and on its outer surfaces a material selected from the group consisting of cobalt and nickel-containing materials, treating said aluminosilicate with an ammine-complexing reagent to convert said material to a new form sufficiently large to prevent it from passing between said interstitial spaces and said outer surfaces, said new form of material being a complex selected from the group consisting of cobalt and nickel ammine complexes, removing said new form of said material which is on said outer surfaces without at the same time removing said new form of said material in said interstitial spaces and converting the new form of said material in said interstitial spaces to an elemental metal selected from the group consisting of nickel and cobalt.

4. A process as defined in claim 3 wherein said crystalline aluminosilicate contains interstitial spaces of about 5 A. diameter.

5. A process for preparing a crystalline aluminosilicate having substantially uniform interstitial spaces and containing a material selected from the group consisting of cobalt and nickel-containing materials and wherein substantially all of said material is restricted to said interstitial spaces, said process comprising: providing a crystalline aluminosilicate having substantially uniform interstitial spaces, said aluminosilicate having in its interstitial spaces and on its outer surfaces a material selected from the group consisting of cobalt and nickel-containing materials, treating said aluminosilicate with a reagent capable of converting said material to a new form sufficiently large to prevent it from passing between said interstitial spaces and said outer surfaces, said reagent being an ammine-complexing agent capable of forming a water soluble complex selected from the group consisting of nickel and cobalt ammine complexes, removing said new form of said material which is on said outer surfaces by dissolving it in water without at the same time removing said new form of said material in said interstitial spaces, and converting the new form of said material in said interstitial spaces to an elemental metal selected from the group consisting of nickel and cobalt.

6. A process for preparing a crystalline aluminosilicate having substantially uniform interstitial spaces and containing a material selected from the group consisting of cobalt and nickel-containing materials and wherein substantially all of said material is restricted to said interstitial spaces, said process comprising: providing a crystalline aluminosilicate having substantially uniform interstitial spaces, said aluminosilicate having in its interstitial spaces and on its outer surfaces a material selected from the group consisting of cobalt and nickel-containing materials, treating said aluminosilicate with $NH_4OH$ to convert said material to a new form sufficiently large to prevent it from passing between said interstitial spaces and said outer surfaces, removing said new form of said material which is on said outer surfaces without at the same time removing said new form of said material in said interstitial spaces, and converting the new form of said material in said interstitial spaces to an elemental metal selected from the group consisting of nickel and cobalt.

7. A process as defined in claim 6 wherein said crystalline aluminosilicate contains interstitial spaces of about 5 A. diameter.

8. A process as defined in claim 7 wherein said crystalline aluminosilicate contains interstitial spaces of less than 5 A. diameter prior to treatment with the $NH_4OH$, the diameter of said interstitial spaces being enlarged to about 5 A. through cation exchange treatment simultaneously with said $NH_4OH$ treatment.

9. A process as defined in claim 8 wherein said interstitial space diameter is enlarged by incorporating a calcium salt in the NH₄OH reagent.

10. A process as defined in claim 9 wherein said crystalline aluminosilicate prior to the reagent treatment is a sodium aluminosilicate containing interstitial spaces of about 4 A. diameter.

11. A process for preparing a crystalline aluminosilicate having substantially uniform interstitial spaces and containing a material selected from the group consisting of cobalt and nickel-containing materials and wherein substantially all of said material is restricted to said interstitial spaces, said process comprising: providing a crystalline aluminosilicate having substantially uniform interstitial spaces, said aluminosilicate having in its interstitial spaces and on its outer surfaces a material selected from the group consisting of cobalt and nickel-containing materials, treating said aluminosilicate with NH₄OH to convert said material to a new form sufficiently large to prevent it from passing between said interstitial spaces and said outer surfaces, said new form of said material being selected from the group consisting of water soluble cobalt and nickel ammine complexes, removing said form of said material which is on said outer surfaces by dissolving it in water without at the same time removing said new form of said material in said interstitial spaces and converting the ammine complex which is in said interstitial spaces following said dissolving step to an elemental metal selected from the group consisting of cobalt and nickel by heating to decompose said ammine complex.

12. A process for preparing a crystalline aluminosilicate having substantially uniform interstitial spaces and containing a material selected from the group consisting of cobalt and nickel-containing materials and wherein substantially all of said material is restricted to said interstitial spaces, said process comprising: providing a crystalline aluminosilicate having substantially uniform interstitial spaces, said aluminosilicate having in its interstitial spaces and on its outer surfaces a material selected from the group consisting of cobalt and nickel-containing materials, treating said aluminosilicate with carbon monoxide to convert said material to a new form sufficiently large to prevent it from passing between said interstitial spaces and said outer surfaces, said new form of material being selected from the group consisting of cobalt and nickel carbonyls, and removing said new form of said material which is on said outer surfaces without at the same time removing said new form of said material in said interstitial spaces.

13. A process as defined in claim 12 comprising the additional step of converting the new form of said material in said interstitial spaces to an elemental metal selected from the group consisting of nickel and cobalt.

14. A process as defined in claim 13 wherein said aluminosilicate contains insterstitial spaces of about 5 A.

15. A process for preparing a crystalline aluminosilicate having substantially uniform interstitial spaces and containing a material selected from the group consisting of cobalt and nickel-containing materials and wherein substantially all of said material is restricted to said interstitial spaces, said process comprising: providing a crystalline aluminosilicate having substantially uniform interstitial spaces, said aluminosilicate having in its interstitial spaces and on its outer surfaces an elemental metal selected from the group consisting of cobalt and nickel, passing a stream of carbon monoxide past and in contact with said aluminosilicate under conditions such as to convert said elemental metal to a metal carbonyl, the metal carbonyl formed on said outer surfaces being swept away in said stream of carbon monoxide.

16. A method as defined in claim 15 comprising the additional step of transforming the metal carbonyl remaining in said interstitial spaces to the elemental form of said metal.

17. A method as defined in claim 16 wherein said crystalline aluminosilicate contains interstitial pores of about 5 A. diameter.

18. A process for preparing a crystalline aluminosilicate having substantially uniform interstitial spaces and having a metal-containing material substantilly all of which is restricted to said interstitial spaces, said process comprising: providing a crystalline aluminosilicate having substantially uniform interstitial spaces, said aluminosilicate having in its interstitial spaces and on its outer surfaces a metal-containing material, treating said aluminosilicate with a reagent capable of converting said material to a new form sufficiently large to prevent it from passing between said interstitial spaces and said outer surfaces and removing said new form of said material which is on said outer surfaces without at the same time removing said new form of said material in said interstitial spaces.

19. A process as defined in claim 18 comprising the additional step of converting the new form of said material in said interstitial spaces to the elemental form of the metal contained therein.

References Cited by the Examiner
UNITED STATES PATENTS

| | | | |
|---|---|---|---|
| 2,132,613 | 10/1938 | Francon | 252—470 |
| 3,039,953 | 6/1962 | Eng | 208—23 |
| 3,140,253 | 7/1964 | Plank et al. | 208—120 |

DELBERT E. GANTZ, *Primary Examiner.*

A. RIMENS, *Assistant Examiner.*